US009918308B2

(12) United States Patent
Feng et al.

(10) Patent No.: US 9,918,308 B2
(45) Date of Patent: *Mar. 13, 2018

(54) ENHANCED PDCCH OVERLAPPING WITH THE PDCCH REGION

(71) Applicant: Panasonic Intellectual Property Corporation of America, Torrance, CA (US)

(72) Inventors: Sujuan Feng, Frankfurt am Main (DE); Alexander Golitschek Edler Von Elbwart, Darmstadt (DE); Christian Wengerter, Kleinheubach (DE)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/245,562

(22) Filed: Aug. 24, 2016

(65) Prior Publication Data

US 2016/0366670 A1  Dec. 15, 2016

Related U.S. Application Data

(63) Continuation of application No. 14/356,359, filed as application No. PCT/EP2012/071921 on Nov. 6, 2012, now Pat. No. 9,462,582.

(30) Foreign Application Priority Data

Nov. 7, 2011 (EP) .................................... 11188121

(51) Int. Cl.
*H04J 3/00* (2006.01)
*H04W 72/04* (2009.01)
(Continued)

(52) U.S. Cl.
CPC ......... *H04W 72/042* (2013.01); *H04L 1/1861* (2013.01); *H04L 5/0053* (2013.01); *H04L 27/2602* (2013.01); *H04L 27/362* (2013.01)

(58) Field of Classification Search
CPC ............... H04W 72/042; H04L 1/1861; H04L 27/2601; H04L 27/362; H04L 5/0053
See application file for complete search history.

(56) References Cited

U.S. PATENT DOCUMENTS 6,178,173 B1  1/2001  Mundwiler et al.
9,019,922 B2  4/2015  Oizumi
(Continued)

FOREIGN PATENT DOCUMENTS

WO  2011/126212 A2  10/2011
WO  2011/128013 A1  10/2011
(Continued)

OTHER PUBLICATIONS

International Search Report for Application No. PCT/EP2012/071921 dated Nov. 27, 2012.

*Primary Examiner* — Robert Wilson
(74) *Attorney, Agent, or Firm* — Pearne & Gordon LLP

(57) ABSTRACT

The present invention relates to configuring search spaces of at least two coexisting control channels in a communication system. In particular, the control channels are defined in at least partially overlapping regions, wherein the overlapping is in the time and/or frequency domain. This configuration enables coexistence of the at least two channels in the same resource grid and better utilization of the resources. Furthermore, it enables sharing of the reference signals.

10 Claims, 8 Drawing Sheets

(51) Int. Cl.
  *H04L 5/00*   (2006.01)
  *H04L 27/26*  (2006.01)
  *H04L 27/36*  (2006.01)
  *H04L 1/18*   (2006.01)

(56) References Cited

U.S. PATENT DOCUMENTS

| | | |
|---|---|---|
| 9,462,582 B2 * | 10/2016 | Feng .................. H04L 27/2602 |
| 2011/0075624 A1 | 3/2011 | Papasakellariou et al. |
| 2011/0243090 A1 * | 10/2011 | Grovlen .................. H04L 1/18 |
| | | 370/329 |
| 2012/0201230 A1 | 8/2012 | Wang et al. |
| 2013/0121295 A1 | 5/2013 | Saito et al. |
| 2014/0307693 A1 * | 10/2014 | Feng .................. H04L 27/2602 |
| | | 370/329 |
| 2015/0131605 A1 * | 5/2015 | Nogami ................ H04L 5/0053 |
| | | 370/330 |
| 2016/0164643 A1 * | 6/2016 | Loehr .................. H04L 1/1854 |
| | | 370/336 |
| 2016/0366670 A1 * | 12/2016 | Feng .................. H04L 27/2602 |
| 2017/0078126 A1 * | 3/2017 | Einhaus ............... H04J 11/0056 |

FOREIGN PATENT DOCUMENTS

| | | |
|---|---|---|
| WO | 2011/132945 A2 | 10/2011 |
| WO | 2011/136523 A2 | 11/2011 |

* cited by examiner

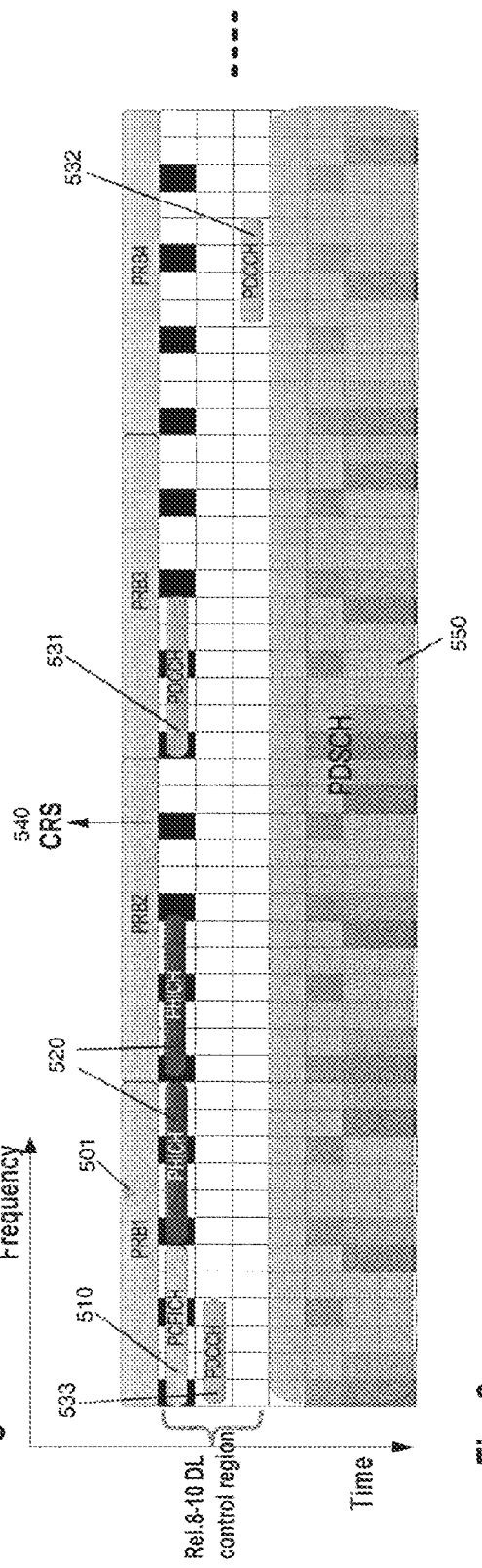
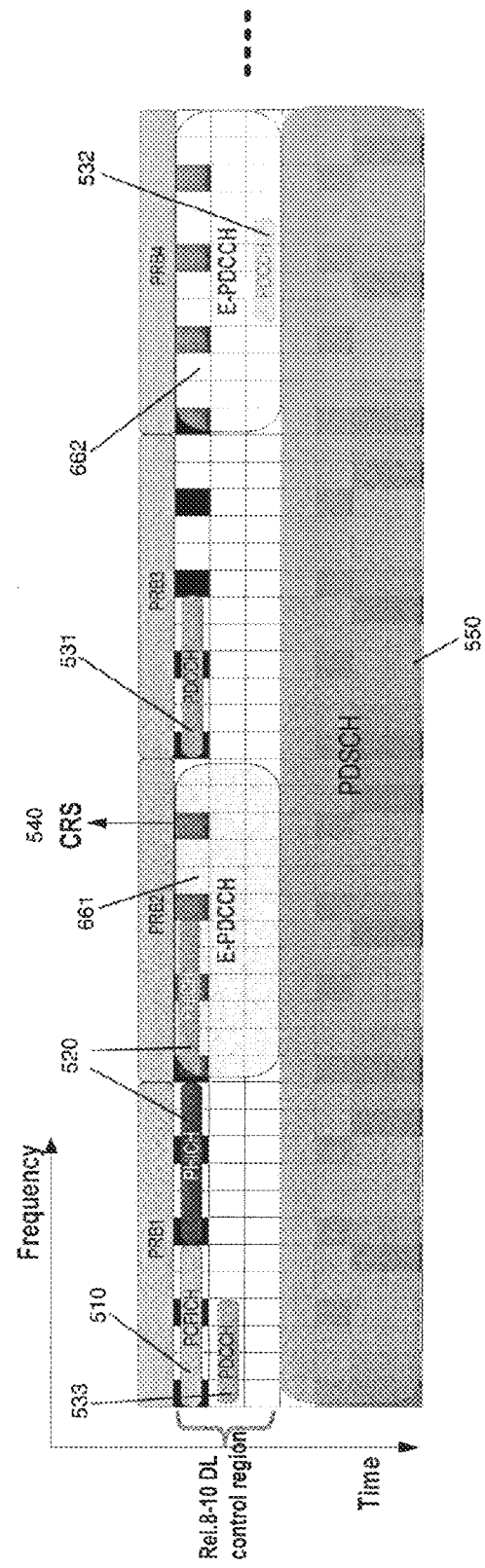

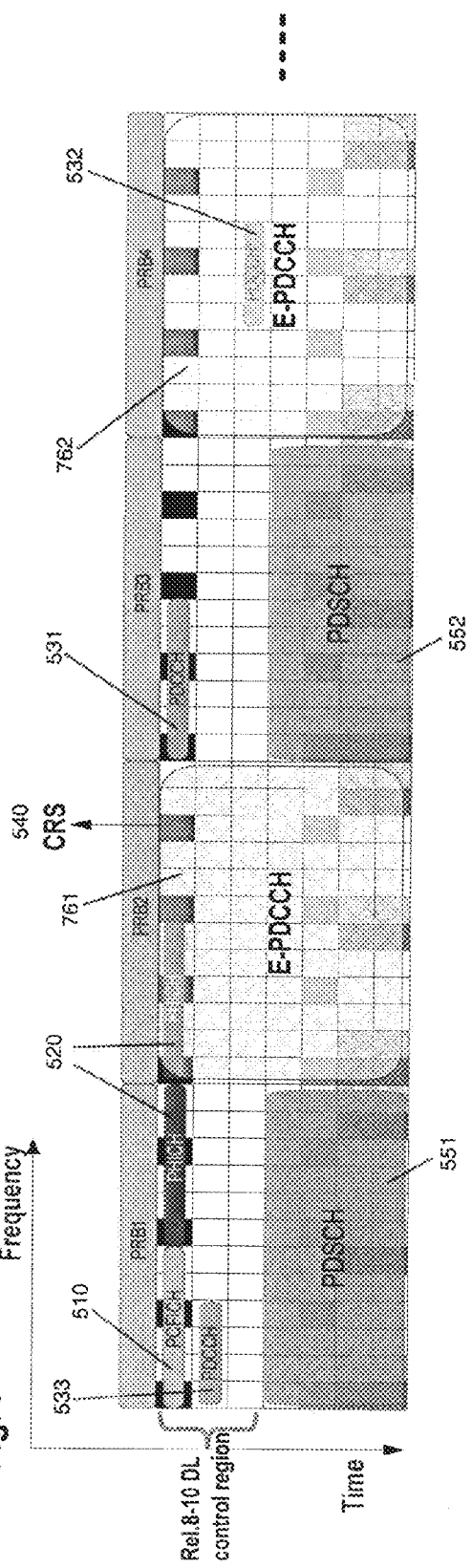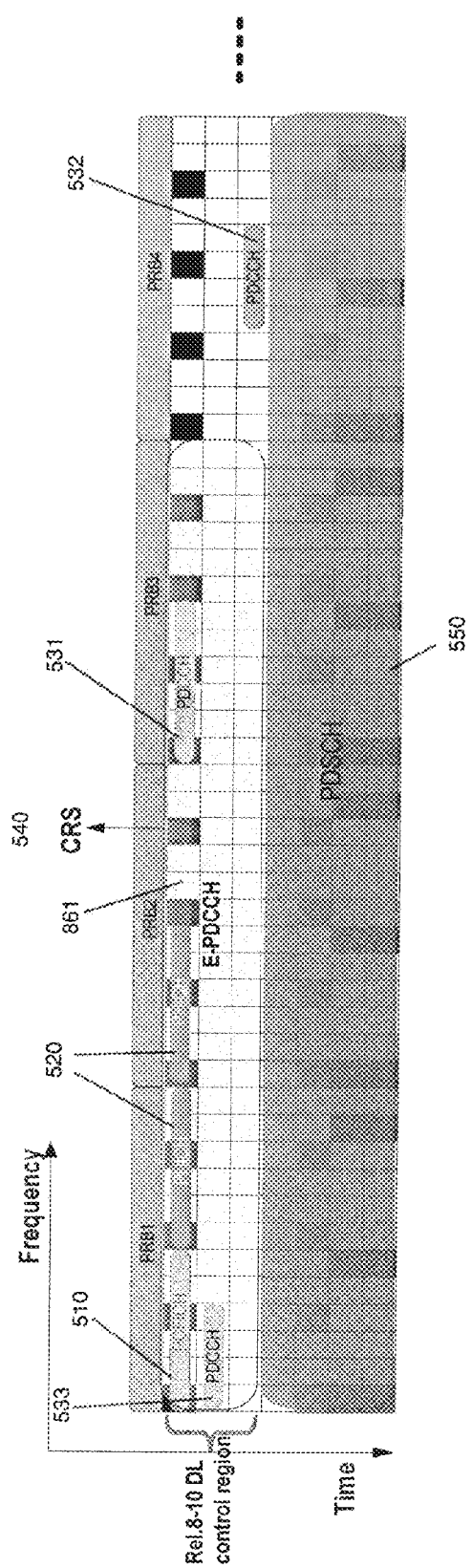

ENHANCED PDCCH OVERLAPPING WITH THE PDCCH REGION

This is a continuation of U.S. patent application Ser. No. 14/356,359 filed on May 5, 2014, which is a national stage of International Application No. PCT/EP2012/071921, which claims priority from European Patent Application No. 11188121.5 filed on Nov. 7, 2011. The contents of these applications are incorporated herein by reference in their entireties.

FIELD OF THE INVENTION

The present invention relates to signaling uplink and downlink grant in an OFDM-based mobile communication system. In particular, the present invention relates to methods and apparatuses for configuration of search space and to search space channel structure for signaling of the uplink and downlink grant control information in coexisting different releases of a communication standard or in two standards.

BACKGROUND OF THE INVENTION

Third generation (3G) mobile systems, such as, for instance, universal mobile telecommunication systems (UMTS) standardized within the third generation partnership project (3GPP) have been based on wideband code division multiple access (WCDMA) radio access technology. Today, 3G systems are being deployed on a broad scale all around the world. After enhancing this technology by introducing high-speed downlink packet access (HSDPA) and an enhanced uplink, also referred to as high-speed uplink packet access (HSUPA), the next major step in evolution of the UMTS standard has brought the combination of orthogonal frequency division multiplexing (OFDM) for the downlink and single carrier frequency division multiplexing access (SC-FDMA) for the uplink. This system has been named long term evolution (LTE) since it has been intended to cope with future technology evolutions.

The LTE system represents efficient packet based radio access and radio access networks that provide full IP-based functionalities with low latency and low cost. The detailed system requirements are given in 3GPP TR 25.913, "*Requirements for evolved UTRA (E-UTRA) and evolved UTRAN (E-UTRAN),*" v8.0.0, January 2009 (incorporated herein by reference). The Downlink will support data modulation schemes QPSK, 16QAM, and 64QAM and the Uplink will support BPSK, QPSK, 8PSK and 16QAM. LTE's network access is to be extremely flexible, using a number of defined channel bandwidths between 1.25 and 20 MHz, contrasted with UMTS terrestrial radio access (UTRA) fixed 5 MHz channels. Spectral efficiency is increased by up to four-fold compared with UTRA, and improvements in architecture and signaling reduce round-trip latency. Multiple Input/Multiple Output (MIMO) antenna technology should enable 10 times as many users per cell as 3GPP's original WCDMA radio access technology. To suit as many frequency band allocation arrangements as possible, both paired (frequency division duplex FDD) and unpaired (time division duplex TDD) band operation is supported. LTE can co-exist with earlier 3GPP radio technologies, even in adjacent channels, and calls can be handed over to and from all 3GPP's previous radio access technologies.

FIG. 1 illustrates structure of a component carrier in LTE Release 8. The downlink component carrier of the 3GPP LTE Release 8 is sub-divided in the time-frequency domain in so-called sub-frames 100 each of which is divided into two downlink slots, one of which is shown in FIG. 1 as 120 corresponding to a time period $T_{slot}$. The first downlink slot comprises a control channel region within the first OFDM symbol(s). Each sub-frame consists of a given number of OFDM symbols in the time domain, each OFDM symbol spanning over the entire bandwidth of the component carrier.

In particular, the smallest unit of resources that can be assigned by a scheduler is a resource block also called physical resource block (PRB). A PRB 130 is defined as $N_{symb}^{DL}$ consecutive OFDM symbols in the time domain and $N_{sc}^{RB}$ consecutive sub-carriers in the frequency domain. In practice, the downlink resources are assigned in resource block pairs. A resource block pair consists of two resource blocks. It spans $N_{sc}^{RB}$ consecutive sub-carriers in the frequency domain and the entire $2 \cdot N_{symb}^{DL}$ modulation symbols of the sub-frame in the time domain. $N_{symb}^{DL}$ may be either 6 or 7 resulting in either 12 or 14 OFDM symbols in total. Consequently, a physical resource block 130 consists of $N_{symb}^{DL} \times N_{sc}^{RB}$ resource elements corresponding to one slot in the time domain and 180 kHz in the frequency domain (further details on the downlink resource grid can be found, for example, in 3GPP TS 36.211, "*Evolved universal terrestrial radio access (E-UTRA); physical channels and modulations (Release 8)*", version 8.9.0, December 2009, Section 6.2, available at http://www.3gpp.org. which is incorporated herein by reference).

The number of physical resource blocks $N_{RB}^{Dl}$ in downlink depends on the downlink transmission bandwidth configured in the cell and is at present defined in LTE as being from the interval of 6 to 110 PRBs.

The data are mapped onto physical resource blocks by means of pairs of virtual resource blocks. A pair of virtual resource blocks is mapped onto a pair of physical resource blocks. The following two types of virtual resource blocks are defined according to their mapping on the physical resource blocks in LTE downlink:

Localised Virtual Resource Block (LVRB)
Distributed Virtual Resource Block (DVRB)

In the localised transmission mode using the localised VRBs, the eNB has full control which and how many resource blocks are used, and should use this control usually to pick resource blocks that result in a large spectral efficiency. In most mobile communication systems, this results in adjacent physical resource blocks or multiple clusters of adjacent physical resource blocks for the transmission to a single user equipment, because the radio channel is coherent in the frequency domain, implying that if one physical resource block offers a large spectral efficiency, then it is very likely that an adjacent physical resource block offers a similarly large spectral efficiency. In the distributed transmission mode using the distributed VRBs, the physical resource blocks carrying data for the same UE are distributed across the frequency band in order to hit at least some physical resource blocks that offer a sufficiently large spectral efficiency, thereby obtaining frequency diversity.

In 3GPP LTE Release 8 there is only one component carrier in uplink and downlink. Within one DL subframe, the first 1 to 4 OFDM symbols are used for downlink control channel and downlink signal transmission (LTE control region). FIG. 5 shows an example of LTE DL control region. Downlink control signaling is basically carried by the following three physical channels:

Physical control format indicator channel (PCFICH) for indicating the number of OFDM symbols used for control signaling in a sub-frame (i.e. the size of the control channel region). For $N_{RC}^{DL}>10$ the PCFICH value is between 0 and 3.

Physical hybrid ARQ indicator channel (PHICH) for carrying the downlink ACK/NACK associated with uplink data transmission. The duration of PHICH, i.e. the number of OFDM symbols used for PHICH, is configured by higher layer. For normal PHICH, the duration is 1 OFDM symbol. For extended PHICH, the duration is 2 to 3 OFDM symbols. The duration of PHICH puts a lower limit on the size of the DL control region determined from the PCFICH value.

Cell-specific reference signals (CRS) are transmitted on one or several of antenna ports 0 to 3. In a normal subframe, CRS is distributed within the subframe across the whole bandwidth. In an MBSFN subframe, CRS shall only be transmitted in the non-MBSFN region, i.e. DL control region, of the MBSFN subframe.

Physical downlink control channel (PDCCH) for carrying downlink scheduling assignments and uplink scheduling assignments.

The PCFICH is sent from a known position within the control signaling region of a downlink sub-frame using a known pre-defined modulation and coding scheme. The user equipment decodes the PCFICH in order to obtain information about a size of the control signaling region in a sub-frame, for instance, the number of OFDM symbols. If the user equipment (UE) is unable to decode the PCFICH or if it obtains an erroneous PCFICH value, it will not be able to correctly decode the L1/L2 control signaling (PDCCH) comprised in the control signaling region, which may result in losing all resource assignments contained therein.

The PDCCH carries control information, such as, for instance, scheduling grants for allocating resources for downlink or uplink data transmission. A physical control channel is transmitted on an aggregation of one or several consecutive control channel elements (CCEs). Each CCE corresponds to a set of resource elements grouped to so-called resource element groups (REG). A control channel element typically corresponds to 9 resource element groups. A scheduling grant on PDCCH is defined based on control channel elements (CCE). Resource element groups are used for defining the mapping of control channels to resource elements. Each REG consists of four consecutive resource elements excluding reference signals within the same OFDM symbol. REGs exist in the first one to four OFDM symbols within one sub-frame. The PDCCH for the user equipment is transmitted on the first of either one, two or three OFDM symbols according to PCFICH within a sub-frame.

Another logical unit used in mapping of data onto physical resources in 3GPP LTE Release 8 (and later releases) is a resource block group (RBG). A resource block group is a set of consecutive (in frequency) physical resource blocks. The concept of RBG provides a possibility of addressing particular RBGs for the purpose of indicating a position of resources allocated for a receiving node (e.g. UE), in order to minimise the overhead for such an indication, thereby decreasing the control overhead to data ratio for a transmission. The size of RBG is currently specified to be 1, 2, 3, or 4, depending on the system bandwidth, in particular, on $N_{RB}^{DL}$. Further details of RBG mapping for PDCCH in LTE Release 8 may be found in 3GPP TS 36.213 *"Evolved Universal terrestrial Radio Access (E-UTRA); Physical layer procedures"*, v8.8.0, September 2009, Section 7.1.6.1, freely available at http://www.3gpp.org/ and incorporated herein by reference.

The UE shall monitor a set of PDCCH candidates on the serving cell for control information in every non-DRX subframe, where monitoring implies attempting to decode each of the PDCCHs in the set according to all the monitored DCI formats. The set of PDCCH candidates to monitor are defined in terms of search spaces.

UE monitors two types of search space: UE specific search space and common search space. Both UE specific search space and common search space have different aggregation levels.

In UE specific search space, there are {6,6,2,2} number of PDCCH candidates at the respective aggregation levels {1,2,4,8} and the PDCCH candidates of each aggregation level are consecutive in CCEs. The starting CCE index of the first PDCCH candidate in aggregation level L is decided by $Y_k \times L$, wherein k is the subframe number and $Y_k$ is decided by k and UE ID. Therefore, the positions of CCEs in UE specific search space are decided by UE ID to reduce the overlapping of PDCCH UE specific search space from different UEs and are randomized from subframe to subframe to randomized the interference from PDCCH in neighboring cells.

In the common search space, there are {4,2} number of PDCCH candidates at respective aggregation levels {4,8}. The first PDCCH candidate in aggregation level L starts from CCE index 0. Therefore, all the UEs monitor the same common search space.

PDCCH for system information is transmitted in common search space, so that all the UEs can receive system information by monitoring common search space.

Physical downlink shared channel (PDSCH) is used to transport user data. PDSCH is mapped to the remaining OFDM symbols within one sub-frame after PDCCH. The PDSCH resources allocated for one UE are in the units of resource block for each sub-frame. In LTE, DL data region starts after the DL control region within one subframe. In DL data region, CRS, PDSCH and corresponding DM-RS are transmitted.

FIG. 2 shows an exemplary mapping of PDCCH and PDSCH within a sub-frame. The first two OFDM symbols form a control channel region (PDCCH region) and are used for L1/L2 control signaling. The remaining twelve OFDM symbols form data channel region (PDSCH region) and are used for data. Within a resource block pairs of all sub-frames, cell-specific reference signals, so-called common reference signals (CRS), are transmitted on one or several antenna ports 0 to 3. In the example of FIG. 3, the CRS are transmitted from two antenna ports: R0 and R1.

Moreover, the sub-frame also includes UE-specific reference signals, so-called demodulation reference signals (DM-RS) used by the user equipment for demodulating the PDSCH. The DM-RS are only transmitted within the resource blocks in which the PDSCH is allocated for a certain user equipment. In order to support multiple input/multiple output (MIMO) with DM-RS, four DM-RS layers are defined meaning that at most, MIMO of four layers is supported. In this example, in FIG. 3, DM-RS layer 1, 2, 3 and 4 are corresponding to MIMO layer 1, 2, 3 and 4.

In September 2009 the 3GPP Partners made a formal submission to the ITU proposing that LTE Release 10 & beyond (LTE-Advanced) be evaluated as a candidate for IMT-Advanced. The ITU has coined the term IMT Advanced to identify mobile systems whose capabilities go beyond those of IMT 2000. In order to meet this new challenge, 3GPPs Organizational Partners have agreed to widen 3GPP's scope to include systems beyond 3G. In 3GPP, further advancements for E-UTRA (LTE-Advanced)

should be studied in accordance with: 3GPP operator requirements for the evolution of E-UTRA and the need to meet/exceed the IMT-Advanced capabilities. The expectancy is that Advanced E-UTRA should provide substantially higher performance compared to what is expected to be the IMT-Advanced requirements in ITU-R.

LTE-A Rel. 10 work started from March 2010 and has already stable in June 2011. The major features included in LTE-A Rel. 10 included Carrier Aggregation, enhanced DL MIMO, UL MIMO, relay and etc.

According to 3GPP TS 36.300 v.2.0, in Carrier Aggregation (CA), two or more Component Carriers (CCs) are aggregated in order to support wider transmission bandwidths up to 100 MHz. A UR may simultaneously receive or transmit on one or multiple CCs depending on its capabilities. It is possible to configure a UE to aggregate a different number of CCs in the UL and the DL.

The number of DL CCs that can be configured depends on the DL aggregation capability of the UE;

The number of UL CCs that can be configured depends on the UL aggregation capability of the UE;

It is not possible to configure a UE with more UL CCs than DL CCs.

When CA is configured, a UE only has one RRC connection with the network. At RRC connection reestablishment/handover, one serving cell provides the NAS mobility information and the security input. The serving cell is referred as Primary Cell (PCell). In the downlink, the carrier corresponding to the PCell is Downlink Primary Component Carrier (DL PCC) while in the uplink it is Uplink Primary Component Carrier (UL PCC).

When CA is configured, a UE may be scheduled over multiple serving cells simultaneously. On each DL CC, there is DL control region. PDSCH on one DL CC can be scheduled by the PDCCH on this DL CC or it can also be cross-carrier scheduled by the PDCCH on another DL CC. Carrier Indicator Field (CIF) allows the PDCCH of a serving cell to schedule resources on another serving cell but with the following restrictions:

Cross-carrier scheduling does not apply to PCell, i.e. PCell is always scheduled via its PDCCH;

When the PDCCH of an SCell is configured, cross-carrier scheduling does not apply to this SCell i.e. it is always scheduled via its PDCCH;

When the PDCCH of an SCell is not configured, cross-carrier scheduling applies and this SCell is always scheduled via the PDCCH of one other serving cell.

In LTE-A, DL control region of LTE is reused. PCFICH is used to indicate the size of DL control region. PHICH carries the hybrid-ARQ ACK/NACK. PDCCH search space is extended to support cross-carrier scheduling.

In LTE-A, UE shall monitor PDCCH search space in one or more activated serving cells as configured by higher layer. For each serving cell on which PDCCH shall be monitored, UE shall monitor UE specific search space of the given serving cell and also UE specific search spaces of the serving cells that are cross-carrier scheduled on the given serving cell.

In LTE-A, DL data region also starts after the DL control region within one subframe. DMRS is used for PDSCH demodulation. Up to 8 layers DM-RS are supported.

Another key feature of the LTE-A is providing relaying functionality by means of introducing relay nodes to the UTRAN architecture of 3GPP LTE-A. Relaying is considered for LTE-A as a tool for improving the coverage of high data rates, group mobility, temporary network deployment, the cell edge throughput and/or to provide coverage in new areas. A relay node is wirelessly connected to radio access network via a donor cell. Depending on the relaying strategy, a relay node may be part of the donor cell or, alternatively, may control the cells on its own. In case the relay node is a part of the donor cell, the relay node does not have a cell identity on its own, however, may still have a relay ID. In the case the relay node controls cells on its own, it controls one or several cells and a unique physical layer cell identity is provided in each of the cells controlled by the relay.

FIG. 4 illustrates an example 3GPP LTE-A network structure using relay nodes. A donor eNodeB (d-eNB) 410 directly serves a user equipment UE1 415 and a relay node (RN) 420 which further serves UE2 425. The link between donor eNodeB 410 and the relay node 420 is typically referred to as relay backhaul uplink/downlink. The link between the relay node 420 and user equipment 425 attached to the relay node (also denoted r-UEs) is called (relay) access link. The donor eNodeB transmits L1/L2 control and data to the micro-user equipment UE1 415 and also to a relay node 420 which further transmits the L1/L2 control and data to the relay-user equipment UE2 425. The relay node may operate in a so-called time multiplexing mode, in which transmission and reception operation cannot be performed at the same time. In particular, if the link from eNodeB 410 to relay node 420 operates in the same frequency spectrum as the link from relay node 420 to UE2 425, due to the relay transmitter causing interference to its own receiver, simultaneous eNodeB-to-relay node and relay node-to-UE transmissions on the same frequency resources may not be possible unless sufficient isolation of the outgoing and incoming signals is provided. Thus, when relay node 420 transmits to donor eNodeB 410, it cannot, at the same time, receive from UEs 425 attached to the relay node. Similarly, when a relay node 520 receives data from donor eNodeB, it cannot transmit data to UEs 425 attached to the relay node. Thus, there is a sub-frame partitioning between relay backhaul link and relay access link.

In relaying operation, a new PDCCH, i.e. relay physical downlink control channel (R-PDCCH) is defined to carry DCI for relay nodes. R-PDCCH is transmitted in the LTE-A data region. PDCCH for DL assignment starts from the $4^{th}$ OFDM symbol in $1^{st}$ slot and ends at the last OFDM symbol in $1^{st}$ slot; PDCCH for UL grant starts from the first OFDM symbol in $2^{nd}$ slot and ends at the last or the one before last OFDM symbol. There is no overlap between Rel. 8-10 control region and R-PDCCH region, since relay does not need to receive Rel. 8-10 PDCCH from eNB after it was connected to eNB.

In the frequency domain, a set of PRBs is configured for potential R-PDCCH transmission by higher layers.

An R-PDCCH can be transmitted on one or several PRBs without being cross-interleaved with other R-PDCCHs in a given PRB. Alternatively, multiple R-PDCCHs can be cross-interleaved in one or several PRBs.

The R-PDCCH without cross-interleaving shall be demodulated based on cell-specific reference signals transmitted on one set of antenna ports {0}, {0,1}, or {0,1,2,3}, or based on UE-specific reference signals transmitted on antenna port 7 assuming that $n_{SCID}=0$; the type of reference signals is configured by higher layers. Spatial multiplexing is not supported for R-PDCCH.

In 3GPP LTE, the resources may be allocated in terms of physical resource blocks (PRB). Some control channels allow for assigning even smaller resource portions. For instance, the PDCCH control channel region within a subframe consists of a set of control channel elements (CCEs).

A PDCCH can aggregate 1, 2, 4 or 8 CCEs. Similarly, R-PDCCH shall likely support aggregation levels 1, 2, 4, and 8. The aggregation may be over CCEs or over physical resource blocks.

Each relay node monitors a set of R-PDCCH candidates of any aggregation levels for control information in every non-DRX subframe. Monitoring refers to attempting to decode each of the R-PDCCHs in the set according to all monitored formats, i.e. blind decoding. Blind decoding is described for UE receiving a PDCCH in 3GPP TS 36.213 "*Evolved Universal terrestrial Radio Access (E-UTRA); Physical layer procedures*", v8.8.0, September 2009, Section 9.1.1, freely available at http://www.3gpp.org/ and incorporated herein by reference). According to the present specifications for UE-specific PDCCH, the search space may include six candidates of aggregation level 1 and 2 and two candidates of aggregation levels 4 and 8. The number of candidates also specifies the number of blind decodings the terminal has to perform.

The search space configuration in terms of resources available to carry R-PDCCH may be configured semi-statically (for instance, by RRC) or fixed.

LTE-A Release 11 work started from September 2011. The major features of LTE-A Release 11 include LTE carrier aggregation enhancements, Further Enhanced Non CA-based ICIC (inter-cell interference coordination) for LTE, Coordinated Multi-Point Operation (CoMP) for LTE—Downlink and etc. Besides, LTE-A Release 11 also includes studies on Coordinated Multi-Point operation (CoMP) for LTE, Enhanced Uplink Transmission for LTE, further Downlink MIMO enhancements for LTE-Advanced.

During the study on CA enhancement, CoMP and DL MIMO, current PDCCH defined in Releases 8-10 shows some disadvantages: Beamforming or spatial multiplexing is not possible, frequency scheduling gain with localized allocation is not possible, because of only distributed DCI transmission is supported and frequency ICIC (Inter-Cell Interference Coordination) is not possible, because of random REG allocation among cells. In order to improve the situation, an enhanced PDCCH (E-PDCCH) is worked on, which would avoid the above problems.

Some contributions discussed within the 3GPP already address the design of E-PDCCH. One of the solutions suggested is to reuse R-PDCCH, extending the design to support spatial multiplexing of E-PDCCH. However, R-PDCCH always starts from the 4$^{th}$ OFDM symbol and is mapped into the data channel area. This solution may lead to resource wasting in case of Release-11 terminals which may leave large portions of UE-specific PDCCH unused.

Another solution (Contribution number R1-113322) suggests inserting new DM-RS into E-PDCCH control channel elements in order to support beamforming and spatial multiplexing. Accordingly, E-PDCCH CCEs are also interleaved with PDCCH CCEs and are distributed across the entire bandwidth. In MBSFN subframes, E-PDCCH is transmitted after PDCCH region and, again, distributed across the entire bandwidth. With this configuration, E-PDCCH is distributed over the whole bandwidth. Thus, frequency-domain ICIC and frequency-selective scheduling cannot be supported.

SUMMARY OF THE INVENTION

In view of the above, the aim of the present invention is to provide a region for a new efficient downlink control signaling in a system with already existing downlink control signaling.

This is achieved by the features of independent claims.

Advantageous embodiments of the invention are subject to the dependent claims.

It is the particular approach of the present invention to provide a search space region for a new control channel, which at least partially overlaps with another control channel, both control channels for transmitting same kind of information.

In accordance with a first aspect of the present invention, a method is provided for transmitting control information for at least one receiving node within a subframe of an OFDM multi-carrier communication system. The method comprises the following steps performed at the transmitting node: A step of configuring a search space for a first control channel in downlink within a first resource region, wherein a resource region (and thus also the first resource region) is a subset of OFDM time and frequency resources; a step of configuring a search space for a second downlink control channel within a second resource region, wherein the second resource region completely or partially overlaps with the first resource region. The first and the second control channels are for carrying resource assignment data. The method further includes the steps of transmitting control information in the search space of the first control channel; and transmitting control information in the search space of the second control channel.

In accordance with a second aspect of the present invention, a method is provided for receiving control information within a subframe of an OFDM multi-carrier communication system. The method comprises the step of configuring a search space for a second downlink control channel within a second resource region, the second resource region overlaps with a first resource region for configuring a first control channel search space. The first and the second control channels are control channels of two different communication systems or system releases, a first and a second communication system, and are for carrying resource assignment data. The method further includes the step of receiving control information by blind decoding of the search space of the second control channel while skipping from the blind detection resource elements used by the first communication system and belonging to at least one of: an ARQ control channel for transmitting ARQ acknowledgement data; a format control channel for transmitting control data indicating the size of the first and/or second region; a reference signal channel for transmitting reference signal; and/or a portion of the control information transmitted in the first channel and common to a plurality of terminals.

In accordance with the third embodiment of the present invention, an apparatus is provided for transmitting control information for at least one receiving node within a subframe of an OFDM multi-carrier communication system, the apparatus comprising: a first configuration unit for configuring a search space for a first control channel in downlink within a first resource region, wherein a resource region is a subset of OFDM time and frequency resources; a second configuration unit for configuring a search space for a second downlink control channel within a second resource region, wherein the second resource region completely or partially overlaps with the first resource region, wherein the first and the second control channels are for carrying resource assignment data; a transmitting unit for transmitting control information in the search space of the first control channel; and for transmitting control information in the search space of the second control channel.

According to a fourth aspect of the present invention, an apparatus is provided for receiving control information within a subframe of an OFDM multi-carrier communication system, the apparatus comprising: a configuration unit for configuring a search space for a second downlink control channel within a second resource region, the second resource region overlaps with a first resource region for configuring a first control channel search space; wherein the first and the second control channels are control channels of two different communication systems or system releases, a first and a second communication system, and are for carrying resource assignment data; a receiving unit for receiving control information by blind decoding of the search space of the second control channel while skipping from the blind detection resource elements used by the first communication system and belonging to at least one of: an ARQ control channel for transmitting ARQ acknowledgement data; a format control channel for transmitting control data indicating the size of the first and/or second region; a reference signal channel for transmitting reference signal; and/or a portion of the control information transmitted in the first channel and common to a plurality of terminals.

According to an advantageous embodiment of the present invention, a protected resource area is defined including resources which are not included in the search space of the second channel. The protected area may be localized or distributed in time and/or frequency and may be reserved for transmission of at least one of: an ARQ control channel for transmitting ARQ acknowledgement data; a format control channel for transmitting control data indicating the size of the first and/or second region; a reference signal channel for transmitting reference signal; and/or a portion of the control information transmitted in the first channel and common to a plurality of terminals. Protecting certain resource areas enables, for instance, configuration of a new control channel (partially) overlapping and coexisting with an old control channel for carrying allocation grants without need for reconfiguring all other control channels for carrying different types of information.

The method may further include a step of determining the second resource region by specifying a starting OFDM symbol and/or an ending OFDM symbol of the second resource region; and a step of transmitting a control message indicating the starting and/or the ending OFDM symbol. In this way, the second resource region may efficiently be configured, for instance, by a higher level signaling such as radio resource control protocol.

Advantageously, the receiving node utilizes for demodulating of the second channel reference signals received in resource elements common for the first and second communication system. This allows reuse of the reference symbols used by the first control channel or user data carrying channel for the demodulation o the second control channel.

The second resource region may also be configured to also overlap with a third resource region for transmitting user data, the third region being different from the first region.

Regarding the communication system, its resources may be subdivided into a plurality of resource blocks, each resource block including a predefined number of symbols in time domain and a predefined number of subcarriers, wherein a resource block is a smallest unit that may be allocated for transmitting a user data and includes a control data region and a user data region. A resource block group is defined as a predefined number of resource blocks. A control channel element consists of a fixed number of resource elements.

Then, the search space for the second downlink control channel may be specified in multiples of the physical resource blocks, wherein the second downlink control channel is carried in the control region and/or the user data region of the specified physical resource blocks. Alternatively, the search space for the second downlink control channel may be specified in multiples of the physical resource block groups, wherein the second downlink control channel is carried in the control region and/or the user data region of the specified physical resource block groups. Still alternatively, the search space for a second downlink control channel is specified in multiples of the control channel elements, wherein the second downlink control channel is carried in the control region and/or the user data region of the specified physical resource blocks or physical resource block groups.

The aggregation resource unit (resource block, resource block group or control channel element as described above) may also be configurable, for instance by a higher level signaling. A minimum aggregation unit may also be configurable according to the number of resource elements in the resource unit and a number of minimum resource elements necessary for E-PDCCH transmission. The minimum aggregation unit may be, for instance 1 resource block, 2 resource blocks, 3 resource blocks, wherein the resource blocks may only be defined on a subset of symbols. However, the minimum aggregation unit may also be counted in multiples of resource block groups or control channel elements or other resource units employed by the communication system for other purposes (data transmission, control information transmission, etc.)

Advantageously, the communication system is a $3^{rd}$ Generation Partnership Project, 3GPP, Long Term Evolution, LTE, the first system release is Release 8 and/or 10 of LTE and the second release is Release 11 and above of LTE, and the first channel is Physical Downlink Control Channel, PDCCH of the first and the second system release and the second channel is enhanced PDCCH of the second system release.

In accordance with another aspect of the present invention, a computer program product comprising a computer-readable medium having a computer-readable program code embodied thereon is provided, the program code being adapted to carry out the present invention.

The above and other objects and features of the present invention will become more apparent from the following description and preferred embodiments given in conjunction with the accompanying drawings in which:

FIG. 5 is a schematic drawing illustrating an example of an LTE DL control region mapping;

FIG. 6 is a schematic drawing illustrating an example of an E-PDCCH search space overlapping the PDSCH region;

FIG. 7 is a schematic drawing illustrating an example of an E-PDCCH search space configurable in units of resource blocks;

FIG. 8 is a schematic drawing illustrating an example of an E-PDCCH search space configurable in units of resource block groups;

DETAILED DESCRIPTION

Figure 1:
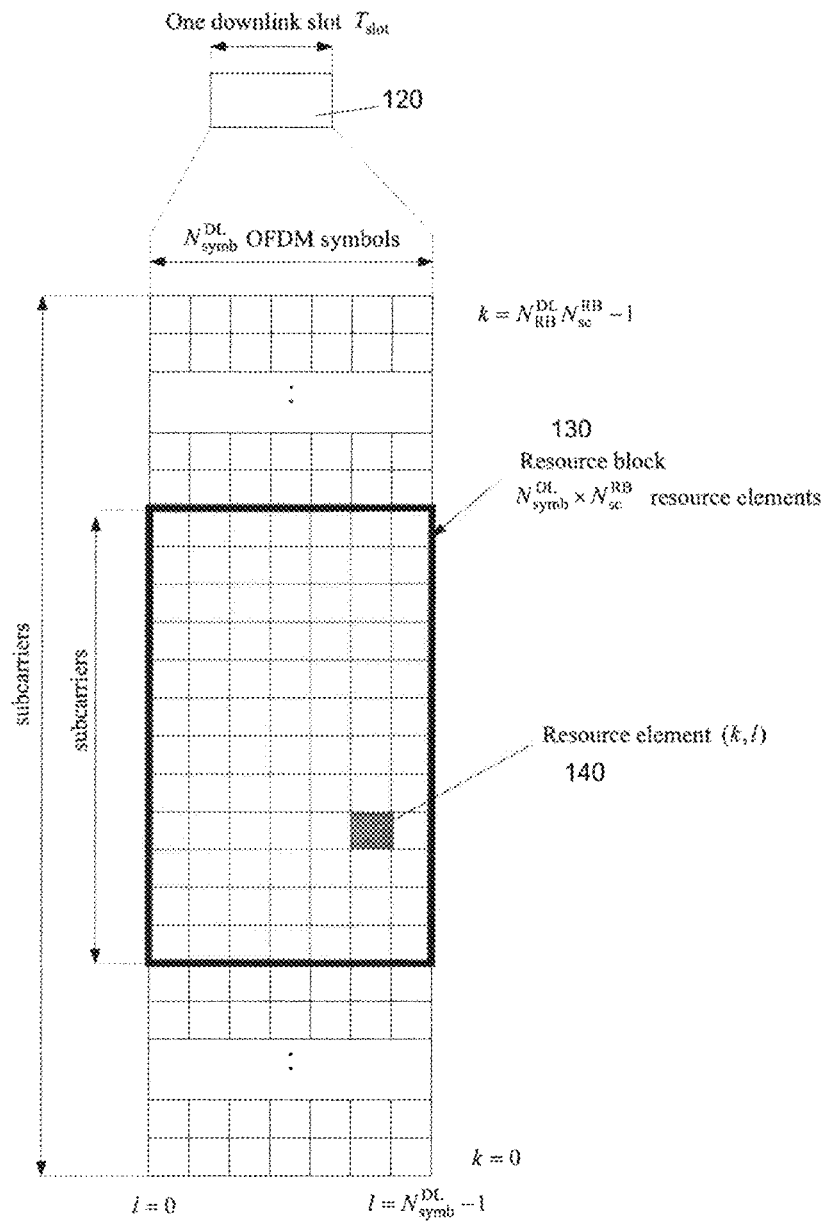
FIG. 1 is a schematic drawing showing the general structure of a sub-frame on a downlink component carrier defined for 3GPP LTE release 8.
Figure 2:
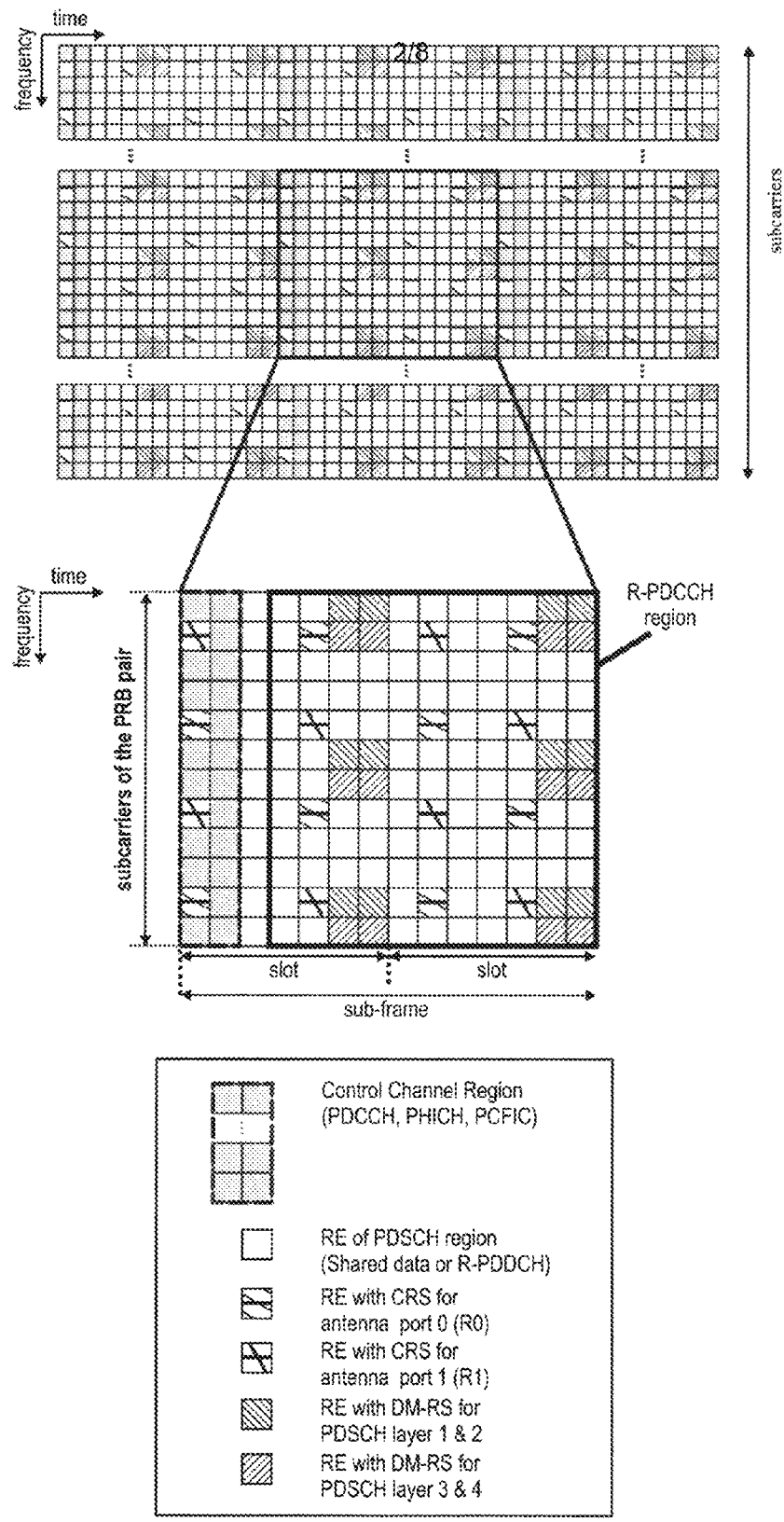
FIG. 2 is a schematic drawing showing an exemplary downlink component carrier of one of two downlink slots of a sub-frame defined for 3GPP LTE release 8.
Figure 3:
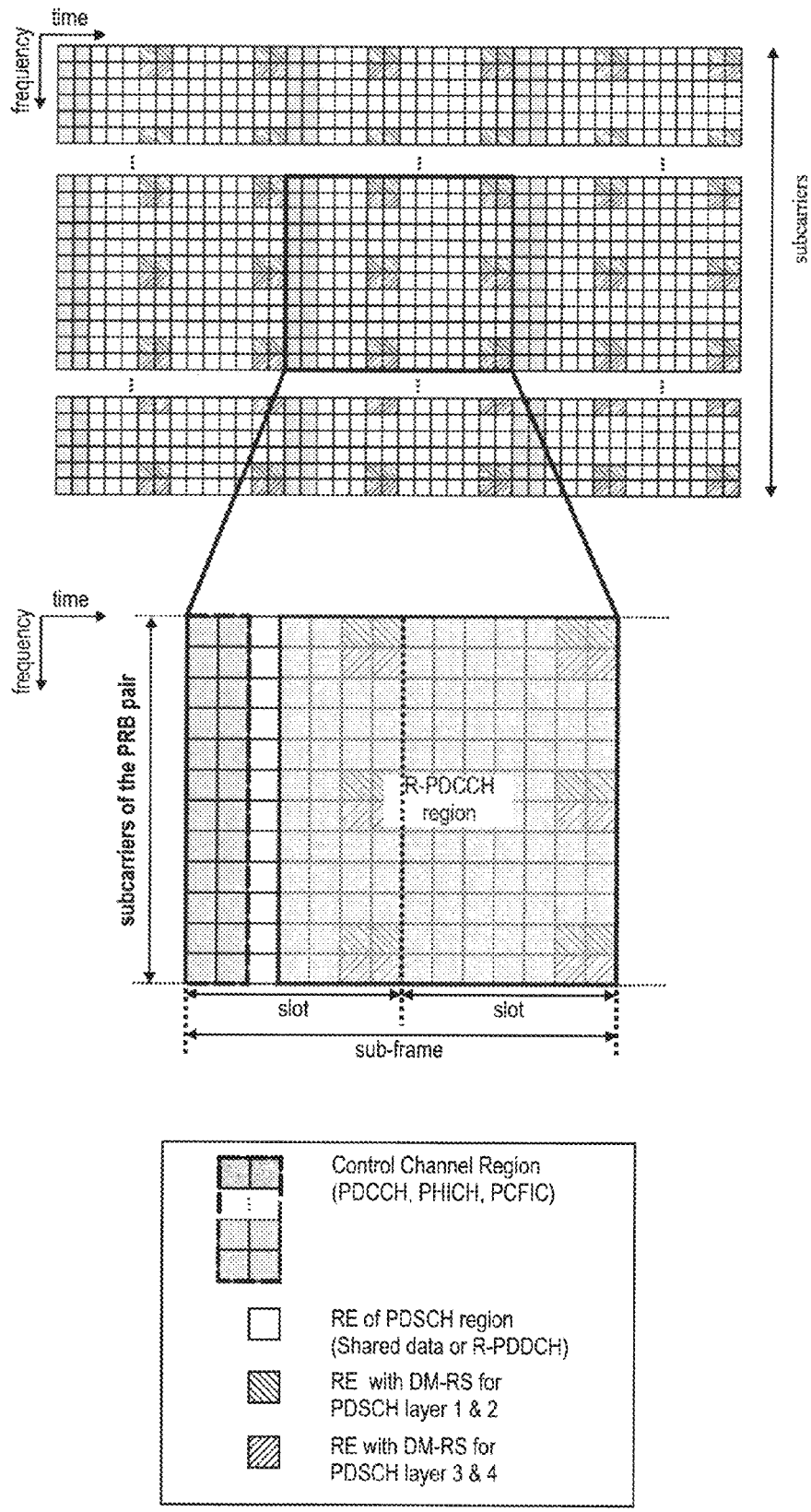
FIG. 3 is a schematic drawing illustrating the structure of a non-MBSFN sub-frames and a physical resource block pair thereof defined for 3GPP LTE release 8 and 3GPP LTE-a release 10.
Figure 4:
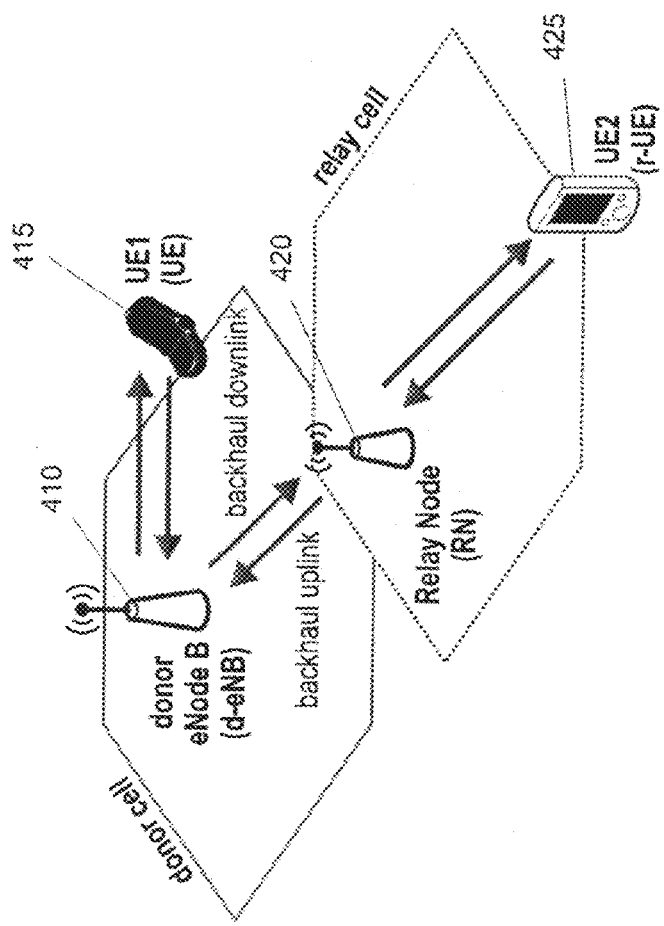
FIG. 4 is a schematic drawing of an exemplary network configuration including a donor eNodeB, a relay node, and two user equipments.

The following paragraphs will describe various embodiments of the present invention. For exemplary purposes only, most of the embodiments are outlined in relation to an OFDM downlink radio access scheme according to 3GPP LTE (Release 8) and LTE-A (Release 10 or 11) mobile communication systems discussed in the Technical Background section above. It should be noted that the invention may be advantageously used for example in connection with a mobile communication system such as 3GPP LTE (Release 8) and LTE-A (Release 10 or 11) communication systems previously described, but the invention is not limited to its use in this particular exemplary communication network. The aspects of the invention described herein may be inter alia used for defining the search spaces for downlink control information (PDCCH, E-PDCCH), mainly carrying assignments and grants for receivers such as UEs in a 3GPP LTE-A (Release 8, 10, or 11) communication systems and for providing an effective resource utilization in terms of PDCCH and E-PDCCH data being mapped to a downlink search spaces (in particular to individual resource blocks, resource block groups or control channel elements thereof). The explanations given in the Technical Background section above are intended to better understand the mostly 3GPP LTE (Release 8) and LTE-A (Release 10 or 11) specific exemplary embodiments described herein and should not be understood as limiting the invention to the described specific implementations of processes and functions in the mobile communication network.

The present invention is based on observation that control channel in the existing release of a communication system may further be improved by later releases. However, in a communication system, backward compatibility is an important paradigm which ensures that older and newer terminals may coexist within the network supporting the later release. Accordingly, the present invention aims at enabling efficient coexistence of control channel for carrying allocation grant information for two different releases of a system or two different systems. However, the present invention may also be used to map two such different control channels within a single system.

Accordingly, the present invention provides a configuration of a first resource region for a first control channel and a configuration of a second resource region for a second downlink control channel, wherein the second resource region completely or partially overlaps with the first resource region. The control information of the first and the second control channel is then transmitted in the respective search spaces.

The channels may be any control channels. In one example, the first and the second channel may be PDCCH and E-PDCCH in LTE. Since PDCCH and E-PDCCH are blindly decoded, the search spaces of these channels for different terminals are configured within the at least partially overlapping resource regions. However, the present invention is not limited thereto. The control channels may also be other two respective control channels one of an earlier release and the other one of a later release, wherein the channels are for carrying similar type of information. For instance, a PHICH and a possible enhanced PHICH or a PCFICH and a possible enhanced PCFICH. According to an aspect of the present invention, the resource regions of these channels may at least partially overlap. However, also these are merely examples, and, in general, also channels with different types of data may have resource regions configurable to at least partially overlap. The channels do not have to apply blind decoding and be organized in search spaces. They may, for example be also allocated.

In general, the idea of the invention is applicable to different releases of a same system or to different systems. In particular, a configuration is provided of two control regions, one is from an earlier release and one is from later release. Within each control region, one or multiple control channels are transmitted. The size (for instance, in terms of the OFDM symbols, i.e. in the time domain) of the two control regions can be configured. When the two regions at least partially overlap with each other, in order to protect the UEs from the earlier release, important control channels in the first control region are protected. The control channels from the second region will skip the REs being protected for those important control channels. On the receiver side, later release UEs know that those REs are skipped for the transmission of control channels in the second region, so that there will not take those REs into account when they decode the control channels in the second control region. It is noted that each receiving terminal may have a terminal specific search space and all the terminals may also have one common search space. From the view of the transmitter there therefore may be more than one search space. Then, all terminal specific search spaces of the first channel are mapped within the first resource region and all terminal specific search spaces of the second channel are mapped within the second resource region.

In order to further improve the coexistence of different control channel within a control region of the communication system resource grid, protected resources may be defined. These protected resources may form a protected area, wherein here, the area may be localized (including adjacent resource units—resource elements, resource blocks or resource block groups, control channel elements) or distributed (including resource unit distributed over time and/or frequency resource units). The resources of the reserved resource area are then not used by the search space of the second channel. Within the second resource region does not include a search space for the second channel but is reserved for transmission of at least one of: an ARQ control channel for transmitting ARQ acknowledgement data (such as PHICH in LTE); a format control channel for transmitting control data indicating the size of the first and/or second region (such as PCFICH in LTE); a reference signal channel for transmitting reference signal; and/or a portion of the control information transmitted in the first channel and common to a plurality of terminals (such as CSS in LTE). The first channel may be, for instance PDCCH of LTE and the second channel may be an E-PDCCH of a later LTE releases.

In general, the first channel may be a channel of a first communication system and a second channel may be a channel of the second communication system. One of the channels may be supported by terminals working according to any of the first or second communication system. Another channel may be supported only by one of the communication systems. This is exemplified by the embodiment in which the first channel is a Release 8/10 LTE PDCCH and the second channel is Release 11 LTE E-PDCCH. However, the present invention is not limited thereto and, in general, both channels may also be supported by both systems, or, only one of the two channels may be supported by only one respective communication system. A second channel may a second release. The reserved area may belong to the first release or be shared by both releases or only to second. Still, the first and second channels may coexist with other control channels which may be at least partially shared by both communication systems (for instance, one of PHICH, PCFICH, CSS, or similar). In general, on Release-11 subframes, Release-8/10 UEs in LTE also monitor other control channels such as PCFICH, PHCIH or CSS (common search space). The CSS and PHICH are also used for Release-11 UEs. Therefore, PCFICH, PHICH, and/or CSS on Release-11 subframes are important for supporting both Release 8/10 UEs and Release-11 UEs.

The configuration of the resource regions (first and/or second resource region) may be performed statically or semi-statically by means of a resource control protocol. For instance, the second resource region may be determined by specifying a starting OFDM symbol and/or an ending OFDM symbol of the second resource region. For instance, only starting symbol may be signaled and it may be assumed that the resource region extends from the starting symbol to the predetermined end symbol of the control resource region. Or vice versa—it may be assumed that the resource region starts at the beginning of the predetermined control region (e.g. at the first OFDM symbol in a subframe) and extends up to the ending symbol. However, both starting and ending symbol may be determined and signaled. A control message may then be transmitted from the transmitting node to the receiving node for indicating the determined starting and/or the ending OFDM symbol. It is noted that the transmitting node may be a base station and/or a network node. It may also be a base station implementing also functions of a network node. The receiving node may be a terminal. In general, one of the transmitting and receiving nodes may also be a relay node. The present invention may also be applied for the coexistence of a PDCCH and a R-PDCCH.

The second resource region is configured to also overlap with a third resource region for transmitting user data, the third region being different from the first region. In terminology of LTE, the user data channel may be, for instance, the PDSCH.

In the communication system, the resources may be subdivided similarly to the LTE into a plurality of resource blocks, each resource blocks including a predefined number of symbols in time domain and a predefined number of subcarriers (i.e., predefined number of resource elements), wherein a resource block is a smallest unit that may be allocated for transmitting a user data and includes a control data region and a user data region. A resource block group may be defined as a predefined number of resource blocks. A control channel element consists of a fixed number of resource elements. The search space for the second downlink control channel may be specified in multiples of the resource units such as resource blocks, physical resource block groups, or control channel elements. Thus, the search space may aggregate more resource units of a certain type. The second downlink control channel may be carried in the control region and/or the user data region of the specified and possibly aggregated resource units.

Moreover, the E-PDCCH may be defined in granularity of control channel elements, formed by multiple of resource elements. The remaining not used REs within the defined resource region for E-PDCCH may be used for the data transmission, such as PDSCH transmission in LTE. This PDSCH allocation may also be performed if other units than control channel elements are used.

Correspondingly to the transmitting of the first and the second control channel, reception may be configured. A search space for the second control channel is specified within a second resource region. The second resource region overlaps with a first resource region for configuring a first control channel search space. The reception by the terminal is performed by blindly decoding the corresponding second search space and skipping the resources of the (possibly distributed) protected resource area.

The receiving node preferably utilizes for demodulating of the second channel reference signals received in resource elements common for the first and second communication system. For instance, the DM-RS of the LTE are reused for the second channel and another control or data channel.

As already indicated, the present invention is advantageously applicable for the communication system being a $3^{rd}$ Generation Partnership Project, 3GPP, Long Term Evolution, LTE. The first system release may be Release 8 and/or 10 of LTE and the second system release may be Release 11 and above of LTE. The first channel may be the Physical Downlink Control Channel, PDCCH of the first and the second system release and the second channel is enhanced PDCCH of the second system release.

The main idea of this invention applied to the LTE system results in an embodiment, in which the overlapping of E-PDCCH region and PDCCH region is supported and, at the same time, PCFICH, PHICH, CSS are protected on the subframe. Besides, such E-PDCCH may support beamforming and/or spatial multiplexing, frequency-domain ICIC and frequency-selective scheduling. In order to protect the PCFICH, PHICH, and/or CSS on Release-11 subframes, in accordance with this embodiment, the PCFICH, PHICH and CSS REGs are not used for E-PDCCH transmission. For instance, the number of protected REGs in the common search space is configured by higher layer signaling or defined by the specification. For example, for small bandwidth, there are more common search space REGs within one RB pair. Therefore, in order to support beamforming of E-PDCCH more efficiently, fewer common search space REGs are advantageously reserved for the PDCCH transmission. On the other hand, when there are no Release-8/10 UEs scheduled on a Release-11 subframe, typically eight CCEs (corresponding to aggregation level) are enough for transporting the system information. When there are few Release 8-10 UEs scheduled on a Release-11 subframe, Release 8-10 UEs can also be scheduled on the PDCCH common search space. In this case, more than eight CCEs reserved in the PDCCH common search space may be beneficial. The scheduling of E-PDCCH on particular resources and/or configuration of the E-PDCCH resource region may be performed dependent on the number of Release 8-10 and/or number of the Release-11 terminals in the cell.

This example described protection of PHICH, PCFICH, and CSS resources so that E-PDCCH does not utilize these resources for the transmission and correspondingly, a receiver of E-PDCCH skips these resources from the blind decoding. However, the present invention is not limited thereto, and, in general, only one or a subset of these channel resources may be protected.

According to another example, within the overlapped area between the E-PDCCH and PDCCH, the PCFICH, PHICH, CRS and/or DMRS and a certain number of REGs belonging to PDCCH common search space are not used for E-PDCCH transmission. Therefore, these REs are not counted when UE blindly decodes E-PDCCH. The number of reserved REGs in the common search space may be also configured by higher layer signaling or fixedly defined by specification depending on the bandwidth.

The efficient support of the beamforming and spatial multiplexing, frequency-domain ICIC and frequency-selective scheduling can be achieved, in particular, by transmitting the E-PDCCH on a few resource block pairs and by using Release-10 DM-RS positions for the E-PDCCH demodulation.

As described above, the E-PDCCH resource region may be configurable statically or semi-statically. For instance, a starting (OFDM) symbol may be semi-statically configured and E-PDCCH region can be overlapped at least partially with the PDCCH region located in the control region. In this case, on Release-11 subframes, the PDCCH REGs can be used for E-PDCCH transmission. Such a mapping prevents wasted of the PDCCH REGs (or, in general, resources).

Alternatively, or in addition, the ending OFDM symbol of E-PDCCH within one RB pair can be configured by higher layer signaling. Therefore, depending on the number of OFDM symbols available for E-PDCCH transmission, the number of REs available for E-PDCCH transmission varies. On the other hand, PCFICH, PHICH, and/or CSS REGs are distributed over the whole bandwidth, so that the number of REGs reserved for the respective PCFICH, PHICH, and/or CSS within each RB pair may differ. As a result, the number of REGs available in each RB pair may also vary from RB pair to RB pair.

In order to reuse the concept of aggregation and search space of Release 8-10 PDCCH, the aggregation unit may be defined. In case of R-PDCCH, the aggregation unit is one RB. In E-PDCCH, due to the variation of the number of REs available for the E-PDCCH, the aggregation unit preferably depends on the number of REs available within one RB pair. This enables that no unnecessary blind decoding is performed due to too small aggregation unit. For example, a minimum size of aggregation unit may be defined and the aggregation unit may contain the minimum number of RBs that satisfy the minimum aggregation unit size. For instance, the minimum aggregation unit size may be a multiple of physical resource block pairs (a resource block group). However, the minimum aggregation unit may also be a single resource block or resource block pair, or even smaller aggregation units such as control channel elements resource elements and/or their multiples.

In accordance with an embodiment of the present invention, a UE performs blind decoding of the E-PDCCH within a set of resource block pairs configured by higher layer signaling. Within the set of RB pairs, OFDM symbols used for PDCCH transmission and OFDM symbols used for E-PDCCH transmission completely or partially overlap. The OFDM symbols used for PDCCH are defined by control format indicator (CFI), which indicates the size of PDCCH region and may not change very frequency during a real operation. The OFDM symbols used for E-PDCCH may be configured by higher layer signaling.

As described above, the size of the E-PDCCH aggregation unit preferably depends on the number of REs available for E-PDCCH transmission within one RB pair.

FIG. 5 illustrates an example of resource configuration in LTE Release 8/10. In particular, the subframe includes a control region, to which control channels are mapped. PDCCH regions 531-533 are distributed in time and frequency being included in symbols 1 to 3 and PRBs 1, 3, and 4. The PCFICH 510 and PHICH 520 are in the first symbol and first two PRBs. CRS 540 and other reference signals (in the data region) are spread over the resource grid. The data region includes PDSCH 550 for transmitting the data. It is noted that this configuration is an exemplary configuration and that the present invention is not limited thereto or to the particular channel types of the LTE.

FIG. 6 shows an example of a search space design. The configuration of all channels except E-PDCCH is similar to the example described above with reference to FIG. 5. The E-PDCCH region 661, 662 starts from the first OFDM symbol and ends at the third OFDM symbols. In this example thus, the symbols of the E-PDCCH completely overlap with symbols of the control region. The E-PDCCH 562 overlapped with PDCCH 532, which may be a portion of a protected area. Similarly, the E-PDCCH 561 overlaps with PHICH 520, which may be a portion of a protected area. E-PDCCH is configured over a subset of the PRBs on which PDCCH is configured, namely, over PRB2 and PRB 4. A PDCCH 533, 531 are also specified on PRB1 and PRB 3.

Within one RB pair, there is roughly 28 REs available for the E-PDCCH transmission, namely 12 subcarriers×3 symbols resulting in 36 resource elements, 4 of which are used for CRS and other 4 for PDCCH or PHICH or the like, resulting in 28 REs. In case one aggregation unit needs to contain at least 36 REs, the minimum size of aggregation unit would thus be two resource blocks as shown in FIG. 6. The unit of N RBs means N RBs (N=1, 2, . . . ) over predetermined number of symbols, here the predetermined number of symbols is three, the E-PDCCH is specified only in the control region of the subframe. The number of symbols may be determined by higher layer signaling. The higher layer signaling is signaling for configuring present channel (E-PDCCH, second channel). In case of LTE, this may be RRC signaling. The number (and position) of REGs (resource elements) to be protected can be adjusted according to the number of Release 8/10 UEs and the bandwidth.

One option is to determine the minimum aggregation unit that meets the minimum size of PDCCH within one subframe and to use the aggregation unit on whole subframe. Another option is to always aggregate the smallest number of RBs that meet the minimum size of PDCCH. For example, on one subframe, aggregation of resource block #1, #2 and #3 can meet the minimum size of PDCCH and aggregation of resource block #4 and #5 can meet the minimum size of PDCCH. In option 1, the minimum aggregation unit is three resource blocks. In option 2, aggregation unit is two resource blocks or three resource blocks; resource block #1, #2 and #3 are one aggregation unit and resource block #4 and #5 are one aggregation unit.

FIG. 7 illustrates another example of an E-PDCCH resource region configuration. In this example, the E-PDCCH 761, 762 is configured on both control region and data region. The E-PDCCH is defined on symbols 1 to 7, i.e. on the entire slot and on PRBs 2 and 4 as in the example of FIG. 6. The starting and/or ending symbol (1 and 7 respectively) may be configured by higher layers. The E-PDCCH region and the PDCCH regions partially overlap. The empty PDCCH resource element groups (REGs) in the PDCCH region can be used for the E-PDCCH transmission. In this example, there are 60 REs (12 subcarriers×7 symbols resulting in 84 REs, minus 20 REs reserved for reference symbols and cca. 4 REs for PDCCH common space or PHICH or the like) available for E-PDCCH. Accordingly, one or half of the PRB may be used as E-PDCCH (minimum) aggregation unit.

FIG. 8 illustrates another example of E-PDCCH search space design. The aggregation unit is multiple RBGs. The number of RBGs belonging to one aggregation unit depends on the number of REs available for E-PDCCH transmission. In the example, the aggregation unit is one RBG. An RBG consists of 3 RBs. In this example, the E-PDCCH RBG 861 covers first three symbols and first three PRBs 1 to 3. The E-PDCCH 861 overlaps with the PDCCH 531, 533 and with PHICH 520 and PCFICH 510, which are preferably forming a protected area in which E-PDCCH transmission and blind decoding do not take place.

Figure 9:
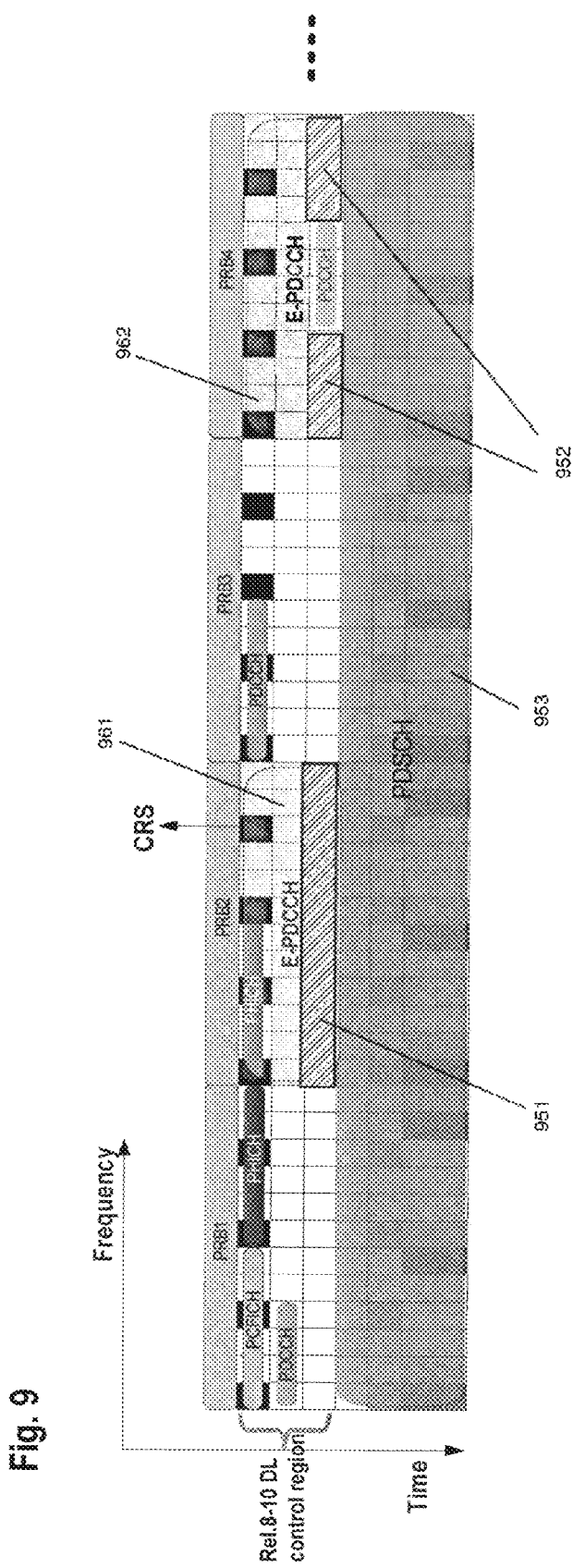
FIG. 9 is a schematic drawing illustrating an example of an E-PDCCH search space configurable in units of control channel elements.

FIG. 9 shows an example of E-PDCCH search space 961, 962 definition in units of control channel elements. At the first glance, FIG. 8 is similar to FIG. 6. However, a CCE is used as an aggregation unit. One CCE may be mapped to one or multiple RB pairs. The remaining REs, which are not used for E-PDCCH transmission, may be used for the PDSCH transmission. Here, the CCE size is defined as 36 REs, the same as PDCCH. The number of available REs for E-PDCCH within two RB pairs is larger than the CCE size, however, the number of REs within one RB pair is smaller than the CCE size. Therefore, one CCE is transmitted on two RB pairs. The mapping of CCEs on multiple RB pairs can be "frequency first" or "time first". This example shows the frequency first mapping, meaning that the CCE is first mapped on all subcarriers of the first configured symbols, then on all subcarriers of the second symbol, etc. In "time first", the CCE is first mapped onto all symbols of the first configured subcarrier, then onto all symbols of the second subcarrier, etc. In other words, the CCE mapping may be subcarrier-wise or symbol-wise.

The remaining REs 951, 952 within the two RB pairs (PRB 2 and 4) are used for PDSCH transmission.

Another variant of the present invention envisages allocating the E-PDCCH across one or multiple RBGs. However, CCE is used as an aggregation unit. The remaining REs within one or multiple RBGs are used for the PDSCH transmission (transmission of user data).

The present invention and its variants provide several benefits. For instance, it enables coexistence of PDCCH and E-PDCCH within the same OFDM symbol. The PDCCH in common search space may be protected. Unnecessary blind decoding due to the too small size of aggregation unit may be avoided. Localized E-PDCCH mapping is supported. Beamforming and spatial multiplexing are supported by sharing the reference signals. Backward compatibility with the UEs of earlier releases is provided.

Correspondingly to the method for receiving and transmitting, an apparatus for receiving and transmitting data and control information in a communication system are provided. An apparatus for transmitting control information for at least one receiving node within a subframe of an OFDM multi-carrier communication system, the apparatus comprising: a first configuration unit for configuring a search space for a first control channel in downlink within a first resource region, wherein a resource region is a subset of OFDM time and frequency resources; a second configuration unit for configuring a search space for a second downlink control channel within a second resource region, wherein the second resource region completely or partially overlaps with the first resource region, wherein the first and the second control channels are for carrying resource assignment data; a transmitting unit for transmitting control information in the search space of the first control channel; and for transmitting control information in the search space of the second control channel.

The apparatus may be, for instance, a NodeB 410 or a relay node 420. However, it may also be any network node or a terminal handling like a relay or master terminal in an ad hoc network. The communication system may be a mobile system, however, it may also be a cable system or a heterogeneous system in which terminals and network nodes or base stations are connected by cable and/or wirelessly.

An apparatus according to the present invention for receiving control information within a subframe of an OFDM multi-carrier communication system may comprise: a configuration unit for configuring a search space for a second downlink control channel within a second resource region, the second resource region overlaps with a first resource region for configuring a first control channel search space; wherein the first and the second control channels are control channels of two different communication systems or system releases, a first and a second communication system, and are for carrying resource assignment data; a receiving unit for receiving control information by blind decoding of the search space of the second control channel while skipping from the blind detection resource elements used by the first communication system.

The skipped elements may belong to at least one of: an ARQ control channel for transmitting ARQ acknowledgement data; a format control channel for transmitting control data indicating the size of the first and/or second region; a reference signal channel for transmitting reference signal; and/or a portion of the data transmitted in the first channel and common to a plurality of terminals. The receiving apparatus may be, for instance a terminal such as UE in LTE. However, it may also be any other node including a network node, a base station or a relay node. The second resource region may be configured to also overlap with a third resource region for transmitting user data, the third region being different from the first region.

Figure 10:
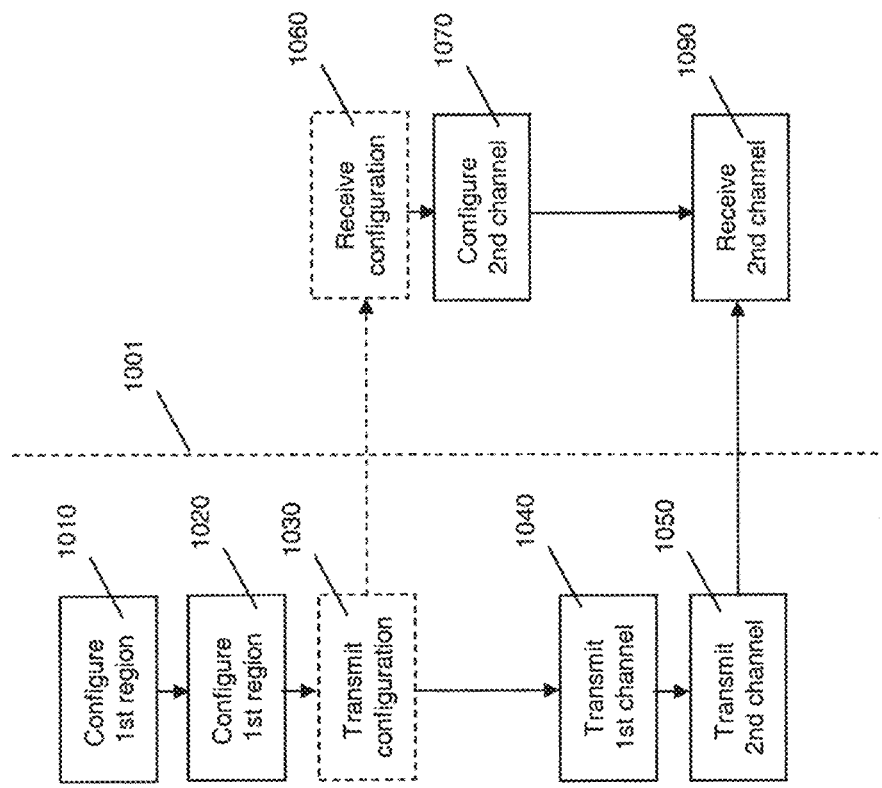
FIG. 10 is a flow diagram illustrating a method according to an embodiment of the present invention.

FIG. 10 summarizes the transmitting and receiving methods according to the present invention. Accordingly, the $1^{st}$ search space is configured 1010 the transmitter. It is noted that this step may include configuring of a plurality of search spaces for the respective terminals in the call. The first search space is, for instance a search space for PDCCH and is configured within a first resource region. Then, the $2^{nd}$ search space is configured 1020 by the transmitter, which may also include configuring more search spaces for a plurality of respective terminals. The second search space may be, for instance, the E-PDCCH search space and is defined within the second resource region. According to the present invention, the first and the second resource regions overlap at least partially. The configuration may also be transmitted 1030 to the receiving node(s). Then, the control information is transmitted in the first channel 1040 and in the $2^{nd}$ channel 1050, i.e. I their respective configured search spaces over an interface 1001. This interface may be a wireless or a cable interface. At the receiving node capable of receiving the second channel, the corresponding steps are performed.

In particular, the configuration of the search spaces and/or resource regions may be received 1060. Then, the search space of the second channel is configured 1070 for reception and blind decoding is performed as the reception 1090 of the second channel while taking into account the overlapping configuration of the $1^{st}$ or other channels. In particular, protected resource elements are not blindly decoded.

Further, the various embodiments of the invention may also be implemented by means of software modules, which are executed by a processor or directly in hardware. Also a combination of software modules and a hardware implementation may be possible. The software modules may be stored on any kind of computer-readable storage media, for example RAM, EPROM, EEPROM, flash memory, registers, hard disks, CD-ROM, DVD, etc.

Most of the embodiments have been outlined in relation to a 3GPP-based architecture of a communication system and the terminology used in the previous sections mainly relates to the 3GPP terminology. However, the terminology and the description of the various embodiments with respect to 3GPP-based architectures are not intended to limit the principles and ideas of the inventions to such systems only. Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the concepts and sub-frame structures proposed herein may be readily applied in the architectures described in the Technical Background section. Furthermore, the concept of the invention may be also readily used in the LTE-A RAN currently discussed by the 3GPP.

Summarizing, the present invention relates to configuring search spaces of at least two coexisting control channels in a communication system. In particular, the control channels are defined in at least partially overlapping regions, wherein the overlapping is in the time and/or frequency domain. This configuration enables coexistence of the at least two channels in the same resource grid and better utilization of the resources. Furthermore, it enables sharing of the reference signals.

The invention claimed is:

1. A method for receiving control information within a subframe of an OFDM multi-carrier communication system, the method comprising the following steps to be performed by a receiving node:
   receiving over the communication system configuration information and configuring a search space for a second downlink control channel within a second resource region in accordance with the configuration information, the second resource region overlaps at least partially with a first resource region for configuring a first control channel search space;
   wherein the first and the second control channels are control channels for carrying resource assignment data;
   receiving over the communication system control information by blind decoding of the search space of the second control channel while skipping from the blind detection resource elements belonging to at least one of:
   an ARQ control channel for transmitting ARQ acknowledgement data;
   a format control channel for transmitting control data indicating the size of the first and/or second region;
   a reference signal channel for transmitting reference signal; and/or
   a portion of the data transmitted in the first channel and common to a plurality of terminals.

2. The method according to claim 1, wherein the receiving node utilizes for demodulating of the second channel reference signals received in resource elements common for a first and a second communication system.

3. The method according to claim 1, wherein the second resource region is configured to also overlap with a third resource region for transmitting user data, the third region being different from the first region.

4. The method according to claim 1, wherein
the OFDM time and frequency resources are subdivided into a plurality of resource blocks, each resource blocks including a predefined number of symbols in time domain and a predefined number of subcarriers, wherein a resource block is a smallest unit that may be allocated for transmitting a user data and includes a control data region and a user data region; and
the search space for the second downlink control channel is specified in multiples of the physical resource blocks, wherein the second downlink control channel is carried in the control region and/or the user data region of the specified physical resource blocks.

5. The method according to claim 1, wherein
the a subset of OFDM time and frequency resources are subdivided into a plurality of resource blocks, each resource blocks including a predefined number of symbols in time domain and a predefined number of subcarriers, wherein a resource block is a smallest unit that may be allocated for transmitting a user data and includes a control data region and a user data region;
a resource block group is defined as a predefined number of resource blocks; and
the search space for the second downlink control channel is specified in multiples of the physical resource block groups, wherein the second downlink control channel is carried in the control region and/or the user data region of the specified physical resource block groups.

6. The method according to claim 1, wherein
the a subset of OFDM time and frequency resources are subdivided into a plurality of resource blocks, each resource blocks including a predefined number of symbols in time domain and a predefined number of subcarriers, wherein a resource block is a smallest unit that may be allocated for transmitting a user data and includes a control data region and a user data region;
a control channel element consists a fixed number of resource elements; and
the search space for a second downlink control channel is specified in multiples of the control channel elements, wherein the second downlink control channel is carried in the control region and/or the user data region of the specified physical resource blocks or physical resource block groups.

7. The method according to claim 1, wherein
the first channel is a Physical Downlink Control Channel, PDCCH of a first and a second system standard release, the second standard release being later than the first standard release, and the second channel is an enhanced PDCCH of the second system release.

8. An apparatus for receiving control information within a subframe of an OFDM multi-carrier communication system, the apparatus comprising:
   a configuration unit for receiving over the communication system configuration information and for configuring a search space for a second downlink control channel within a second resource region in accordance with the configuration information, the second resource region overlaps at least partially with a first resource region for configuring a first control channel search space;
   wherein the first and the second control channels are control channels for carrying resource assignment data;
   a receiving unit for receiving over the communication system control information by blind decoding of the search space of the second control channel while skipping from the blind detection resource elements belonging to at least one of:

an ARQ control channel for transmitting ARQ acknowledgement data;
a format control channel for transmitting control data indicating the size of the first and/or second region;
a reference signal channel for transmitting reference signal; and/or
a portion of the data transmitted in the first channel and common to a plurality of terminals.

9. The apparatus according to claim 8, wherein the second resource region is configured to also overlap with a third resource region for transmitting user data, the third region being different from the first region.

10. The apparatus according to claim 8, wherein
the a subset of OFDM time and frequency resources are subdivided into a plurality of resource blocks, each resource blocks including a predefined number of symbols in time domain and a predefined number of subcarriers, wherein a resource block is a smallest unit that may be allocated for transmitting a user data and includes a control data region and a user data region;
a resource block group is defined as a predefined number of resource blocks; and
a control channel element consists a fixed number of resource elements, and
the search space for the second downlink control channel is specified in multiples of the physical resource blocks, wherein the second downlink control channel is carried in the control region and/or the user data region of the specified physical resource blocks; or
the search space for the second downlink control channel is specified in multiples of the physical resource block groups, wherein the second downlink control channel is carried in the control region and/or the user data region of the specified physical resource block groups; or
the search space for a second downlink control channel is specified in multiples of the control channel elements, wherein the second downlink control channel is carried in the control region and/or the user data region of the specified physical resource blocks or physical resource block groups.

* * * * *